(12) United States Patent
Roux

(10) Patent No.: US 9,800,703 B2
(45) Date of Patent: Oct. 24, 2017

(54) HANDLING APPARATUS FOR PORTABLE ELECTRONIC DEVICES

(71) Applicant: TecTide Group, LLC, Trabuco Canyon, CA (US)

(72) Inventor: Michael A. Roux, Trabuco Canyon, CA (US)

(73) Assignee: TecTide Group, LLC, Trabuco Canyon, CA (US)

( * ) Notice: Subject to any disclaimer, the term of this patent is extended or adjusted under 35 U.S.C. 154(b) by 0 days.

(21) Appl. No.: 15/360,417

(22) Filed: Nov. 23, 2016

(65) Prior Publication Data

US 2017/0149941 A1 May 25, 2017

Related U.S. Application Data

(60) Provisional application No. 62/258,719, filed on Nov. 23, 2015.

(51) Int. Cl.
| | |
|---|---|
| *H04M 1/02* | (2006.01) |
| *A45F 5/10* | (2006.01) |
| *H04M 1/04* | (2006.01) |
| *H04B 1/3888* | (2015.01) |

(52) U.S. Cl.
CPC ............ *H04M 1/04* (2013.01); *H04B 1/3888* (2013.01); *H04M 1/0281* (2013.01); *A45F 2200/0516* (2013.01)

(58) Field of Classification Search
CPC .... H04M 1/0279; H04M 1/0281; H04M 1/04; A45F 2200/0516; A45F 2200/0525; H04B 1/3888

USPC .......................................... 294/25, 142, 169
See application file for complete search history.

(56) References Cited

U.S. PATENT DOCUMENTS

| | | |
|---|---|---|
| 4,955,493 A | 9/1990 | Touzani |
| 5,568,549 A | 10/1996 | Wang |
| 6,196,850 B1 | 3/2001 | Dietz et al. |
| D471,547 S | 3/2003 | Ruohonen |
| 6,776,660 B1 | 8/2004 | Kubota et al. |
| 6,781,522 B2 | 8/2004 | Sleva et al. |
| D532,004 S | 11/2006 | Kettula et al. |
| 7,324,156 B2 | 1/2008 | Lohr et al. |
| D570,593 S | 6/2008 | Justiss |
| 7,422,486 B2 | 9/2008 | Hoff et al. |
| 7,540,788 B2 | 6/2009 | Murphy et al. |
| 7,581,119 B2 | 8/2009 | Tupman et al. |
| 7,644,895 B2 | 1/2010 | Tseng |
| 7,678,271 B2 | 3/2010 | Curtin |

(Continued)

FOREIGN PATENT DOCUMENTS

EP        2 670 053        * 12/2013

*Primary Examiner* — Dean J Kramer
(74) *Attorney, Agent, or Firm* — Dicke, Billig & Czaja, PLLC

(57) ABSTRACT

A handling apparatus for a mobile electronic device, such as a handheld smart phone. The handling apparatus includes a base, a first wing body and a second wing body. The base defines a length and a width. The first and second wing bodies each define a fixed end connected to the base and a free end opposite the fixed end. The free end is spaced from the base in a deployed state of the corresponding wing body. The first and second wing bodies are arranged to extend from the corresponding fixed end to the corresponding free end in an identical direction relative to a length of the base.

15 Claims, 15 Drawing Sheets

(56) References Cited

U.S. PATENT DOCUMENTS

| | | |
|---|---|---|
| 7,782,610 B2 | 8/2010 | Diebel et al. |
| 7,983,034 B1 | 7/2011 | Mohoney |
| D647,085 S | 10/2011 | Chung et al. |
| 8,078,224 B2 | 12/2011 | Fadell et al. |
| 8,080,975 B2 | 12/2011 | Bessa et al. |
| D663,294 S | 7/2012 | Buxton |
| D675,197 S | 1/2013 | Losiewicz |
| 8,560,031 B2 | 10/2013 | Barnett et al. |
| 8,636,183 B1 * | 1/2014 | Steiner .................... B60R 11/02 224/483 |
| 8,737,066 B1 | 5/2014 | Block |
| 8,752,875 B1 * | 6/2014 | Gerhardt .................. A45F 5/00 294/165 |
| 8,844,098 B2 | 9/2014 | Karmatz |
| 8,983,559 B2 * | 3/2015 | Chiu ..................... H04M 1/185 379/433.11 |
| 9,220,327 B2 * | 12/2015 | Hsu ........................ A45C 11/00 |
| 2005/0243522 A1 | 11/2005 | Nilsen et al. |
| 2007/0093786 A1 | 4/2007 | Goldsmith et al. |
| 2007/0164036 A1 | 7/2007 | Brandenburg |
| 2008/0053770 A1 | 3/2008 | Tynyk |
| 2008/0090443 A1 | 4/2008 | Ackloo |
| 2008/0123287 A1 | 5/2008 | Rossell et al. |
| 2008/0146958 A1 | 6/2008 | Guillory et al. |
| 2008/0221404 A1 | 9/2008 | Tso |
| 2008/0268916 A1 | 10/2008 | Lin et al. |
| 2008/0273297 A1 | 11/2008 | Kumar |
| 2009/0115367 A1 | 5/2009 | Kidakam |
| 2009/0240297 A1 | 9/2009 | Shavit et al. |
| 2011/0015496 A1 | 1/2011 | Sherman et al. |
| 2011/0031287 A1 | 2/2011 | Le Gette et al. |
| 2011/0036876 A1 | 2/2011 | Fathollahi |
| 2011/0084081 A1 | 4/2011 | Chung et al. |
| 2011/0117974 A1 | 5/2011 | Spitalnik et al. |
| 2011/0252839 A1 | 10/2011 | Stevens |
| 2011/0299231 A1 | 12/2011 | Gaddis, II et al. |
| 2011/0301439 A1 | 12/2011 | Albert et al. |
| 2012/0042476 A1 | 2/2012 | Karmatz |
| 2012/0228346 A1 * | 9/2012 | Huang ..................... A45F 5/00 224/218 |
| 2012/0267402 A1 | 10/2012 | Beatty |
| 2012/0275131 A1 * | 11/2012 | Huang .................... G06F 1/166 361/810 |
| 2013/0277992 A1 * | 10/2013 | Senoff ..................... A45F 5/00 294/25 |
| 2014/0167431 A1 | 6/2014 | Enkerlin et al. |
| 2015/0084356 A1 | 3/2015 | Dinh et al. |
| 2015/0245519 A1 * | 8/2015 | Forristall .............. H02J 7/0054 320/103 |

\* cited by examiner

HANDLING APPARATUS FOR PORTABLE ELECTRONIC DEVICES

CROSS REFERENCE TO RELATED APPLICATIONS

This Non-Provisional Patent Application claims the benefit of the filing date of U.S. Provisional Patent Application Ser. No. 62/258,719, filed Nov. 23, 2015, entitled "HANDLING APPARATUS FOR PORTABLE ELECTRONIC DEVICES" the entire teachings of which are herein incorporated by reference.

BACKGROUND

The present disclosure relates to user handling of a handheld electronic device. More particularly, it relates convenient handling and operation of portable electronic devices, such as mobile phones, with a single hand of a user.

Handheld or portable electronic devices, such as mobile phones, come in a variety of shapes and sizes. With the advancement of "smart" technologies (e.g., smart phones), a touch screen is often included with the electronic device. With these and other devices, there is often a need for two hands to complete a task on a device (e.g., texting using a mobile phone). Many times it is inconvenient to use two hands and/or the user may prefer or desire to use only a single hand when operating the device.

Single-handed handling or operation of mobile electronic devices can be problematic for many users. With only a single hand grasping the device, the device is more readily dropped, and the user may be unable to perform a desired task (such as reaching the thumb of the user's single hand across an entirety of an available touch screen area). While various gripping devices have been devised (e.g., non-slip surface cases, finger loops, kickstand-type arms), problems associated with single-handed handling of mobile electronic devices have not been fully resolved.

SUMMARY

The inventions of the present disclosure address one or more of the above noted problems.

Some aspects of the present disclosure are directed toward a handling apparatus that facilitates single-handed handling and/or operation of a portable electronic device, such as a mobile phone (e.g., smart phone). In some embodiments, the handling apparatuses of the present disclosure provide the user a means to hold a portable electronic device securely, are easy to use one-handed, and are comfortable to use for longer periods of time as compared to conventional gripping devices. In some embodiments, the handling apparatuses of the present disclosure keeps a user's mobile phone securely in the hand while allowing the user to text freely with one hand without having the user's fingers feel "trapped" in the apparatus or permanently attached to it. In other embodiments, the handling apparatuses of the present disclosure are readily transitionable between retracted and deployed (or closed and open) states, with one hand, allowing immediate access. In other embodiments, the handling apparatuses of the present disclosure provide comfortable handling of the mobile electronic device with a single hand over an extended period of time, and include a multipoint design that is stable in the user's hand. In yet other embodiments, the handling apparatuses of the present disclosure are adjustable in orientation relative to the mobile electronic device, for example to promote different modes of operation (e.g., a text mode and a phone mode when a user brings the device up to a different position at the user's ear for a phone call).

DETAILED DESCRIPTION

Figure 1A:
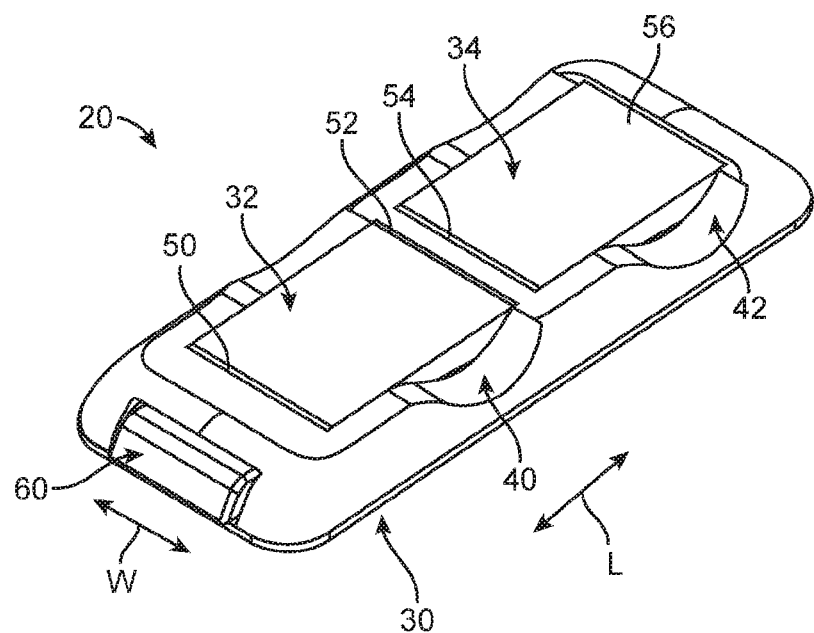
FIG. 1A is perspective view of a handling apparatus in accordance with principles of the present disclosure, including wing bodies in a retracted state.
Figure 1B:
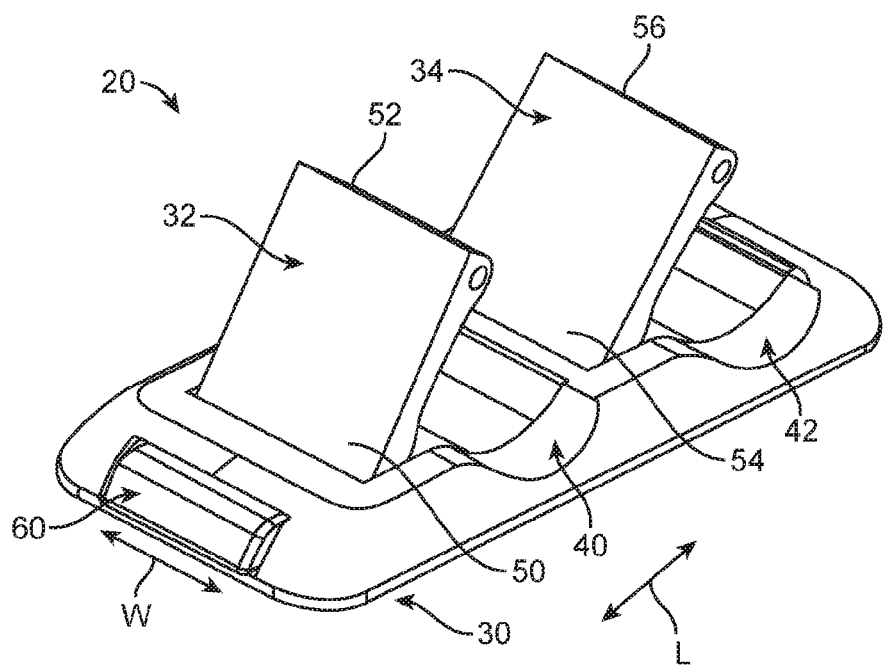
FIG. 1B is a perspective view of the handling apparatus of FIG. 1A and with the wing bodies in a deployed state.

One embodiment of a handling apparatus 20 in accordance with principles of the present disclosure is shown in FIGS. 1A and 1B. The apparatus 20 includes a base 30, a first wing body 32, and a second wing body 34. As described in greater detail below, in some embodiments, the wing bodies 32, 34 are each pivotably connected to the base 30, and are repeatedly transitionable between a retracted or closed state (FIG. 1A) and deployed or open state (FIG. 1B). In other embodiments, the handling apparatuses of the present disclosure can be configured such that the wing bodies 32, 34 permanently maintain the deployed state (e.g., cannot be readily transitioned from the arrangement of FIG. 1B). While various embodiments of the present disclosure include or provide two wing bodies (e.g., the wing bodies 32, 34), any of the handling apparatuses of the present disclosure can alternatively include or provide three or more wing bodies.

The base 30 can assume a wide variety of forms, and is generally sized and shaped in accordance with an expected footprint of the mobile electronic device (not shown) with which the handling apparatus 20 will be used. For example, in some embodiments, a footprint of the base 30 (and thus of the holding apparatus) is less than that of typical mobile smart phones. Thus, the base 30 can have the generally rectangular shape shown, although any other shape is equally acceptable. Regardless, a shape of the base 30 defines a length or length direction L and a width or width direction W.

The base 30 can include or carry various features that promote arrangement of the wing bodies 32, 34 in the retracted and deployed states. Further, and as best seen in FIG. 1B, the base 30 optionally forms first and second contours or grooves 40, 42 immediately adjacent a respective one of the wing bodies 32, 34 for reasons made clear below. Where provided, the grooves 40, 42 generally extend in the width direction W, and are generally sized and shaped in accordance with the size and shape of a finger of a human hand.

The base 30 holds the wing bodies 32, 34 for receiving the front of the user's fingers and can employ a variety of different materials that provide a comfortable finger landing surface such as foam, fabric, rubber and/or metal. Edges of contours of the base 30 can be configured to provide additional touch points and micro finger control.

The handling apparatus 20 can incorporate various features that promote mounting of the base 30 to a mobile electronic device (not shown). For example, the base 30 can be size and shaped for direct mounting to the electronic device. In other embodiments, the handling apparatus 20 can incorporate other mounting techniques, such as double-sided tape, glue (permanent or removable), hook and loop materials, or other mechanical attachment devices. In yet other embodiments, the base 30 can be integrally formed by a case of the electronic device. In yet other embodiments, the handling apparatus can include a separate housing configured for mounting to the mobile electronic device and rotatably connected to the base 30; these optional constructions allow a user to selectively rotate the base 30 (and thus the wing bodies 32, 34) relative to the mobile electronic device to a more comfortable handling position for a particular task (e.g., texting, on ear phone call, etc.). These optional embodiments could be beneficial for left and/or right handed users.

The wing bodies 32, 34 are, in some embodiments, identical, and can assume a wide variety of forms. In other embodiments, the wing bodies 32, 34 can differ from one another in terms of at least size and/or shape. The first wing body 32 defines a fixed end 50 opposite a free end 52; similarly, the second wing body 34 defines a fixed end 54 opposite a free end 56. The fixed ends 50, 54 are connected to the base 30, and the free ends 52, 56 are spaced away from the base 30 in the deployed state. With these definitions in mind, a direction of extension for each of the wing bodies 32, 34 can be defined from the fixed end 50, 54 to the corresponding free end 52, 56. The wing bodies 32, 34 both extend in the same direction, such as in-line or parallel with the length direction L of the base 30. With this construction, for example, a spacing between the fixed ends 50, 54 (e.g., in the length direction L) is the same as the spacing between the free ends 52, 56. While FIGS. 1A and 1B illustrate two of the wing bodies 32, 34, in other embodiments, three or more of the wing bodies can be provided.

An inner surface of each of the wing bodies 32, 34 can be contoured in accordance with the general size and shape of a human finger, promoting a comfortable fit of a single finger against the inner surface. The wing bodies 32, 34 can be constructed from a variety of materials, such as plastic, metal, wood, fabric, etc. The inner or gripping surface of the wing body 32, 34 for interfacing with the side and rear of a user's finger can incorporate a variety of different materials such as foam, gel, heat absorbing or cooling substances, fabric, rubber, metal, etc., that provide comfortable contact with user's finger.

Figure 2:
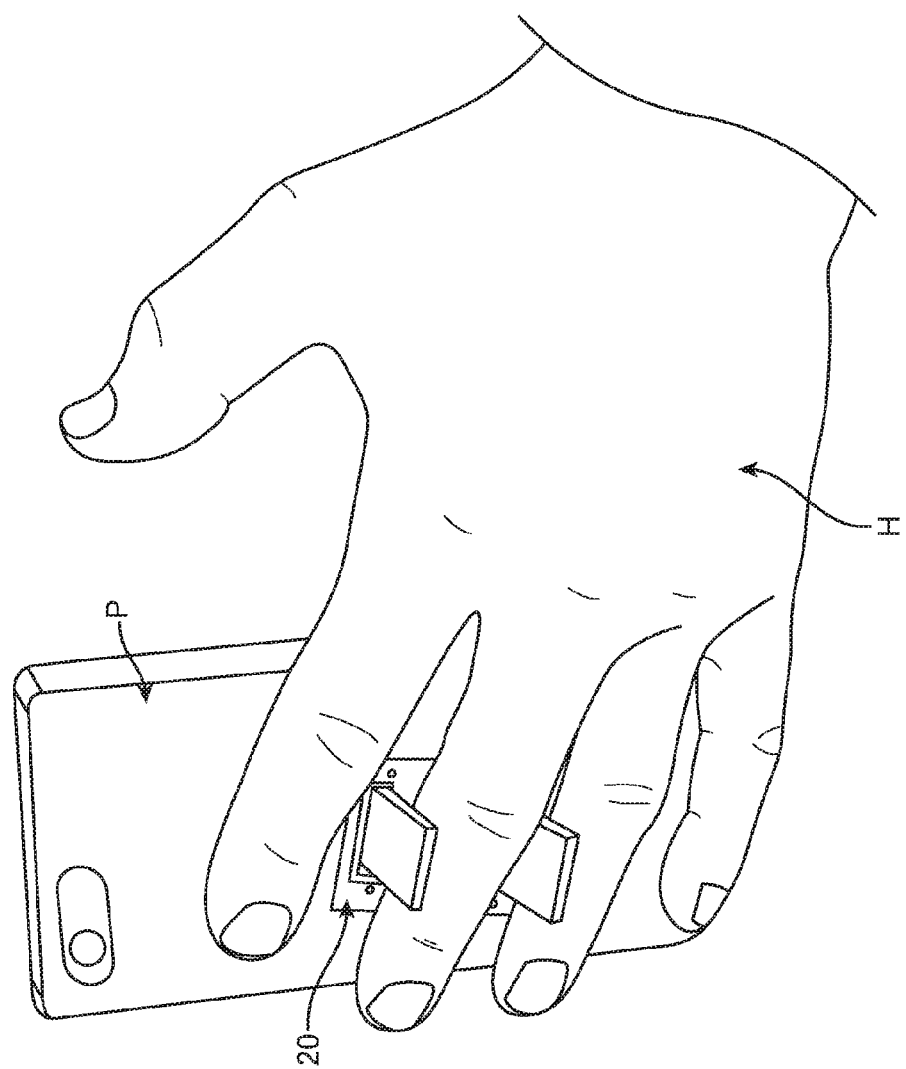
FIG. 2 is a perspective view of the handling apparatus of FIGS. 1A and 1B mounted to a mobile electronic device and illustrating use of the handling device by a user's hand.

In the deployed state of FIG. 1B, the handling apparatus 20 promotes single-handed handling at the first and second wing bodies 32, 34. The user locates a first finger (not shown) of the user's hand in the first groove 40 such that the first finger abuts the first wing body 32; a second finger of the user's hand is similarly located in the second groove 42 such that the second finger abuts the second wing body 34. The mobile electronic device (not shown) to which the handling apparatus 20 has been attached is then spatially arranged such that the fixed ends 50, 54 of the wing bodies 32, 34 are vertically above the corresponding free end 52, 56. When so-oriented, gravity naturally directs the wing bodies 32, 34 into robust engagement or contact with the user's fingers, rending the handling apparatus 20, and thus the mobile electronic device, secured to the user's hand without requiring the user to exert a gripping force on to the mobile electronic device. This relationship is further illustrated in FIG. 2 in which the handling apparatus 20 has been mounted to a mobile phone P. The wing bodies 32, 34 have been manipulated to the deployed state. In the deployed state, fingers of a user's hand H readily interface with the handling apparatus 20 in handling the mobile phone P; gravity naturally directs the wing bodies 32, 34 into robust engagement or contact with the user's fingers.

Returning to FIGS. 1A and 1B and as mentioned above, the handling apparatus 20 can be configured such that the wing bodies 32, 34 are transitionable between the retracted and deployed states. In this regard, the handling apparatuses of the present disclosure can incorporate various biasing devices for biasing the wing bodies 32, 34 to the deployed state, various holding devices for temporarily maintaining the wing bodies 32, 34 in the retracted state, and/or various release mechanisms for selectively releasing the wing bodies 32, 34 from the retracted state (e.g., such as by user-prompted actuation of a button 60). Embodiments of one or more of these optional features are described below.

Figure 3A:
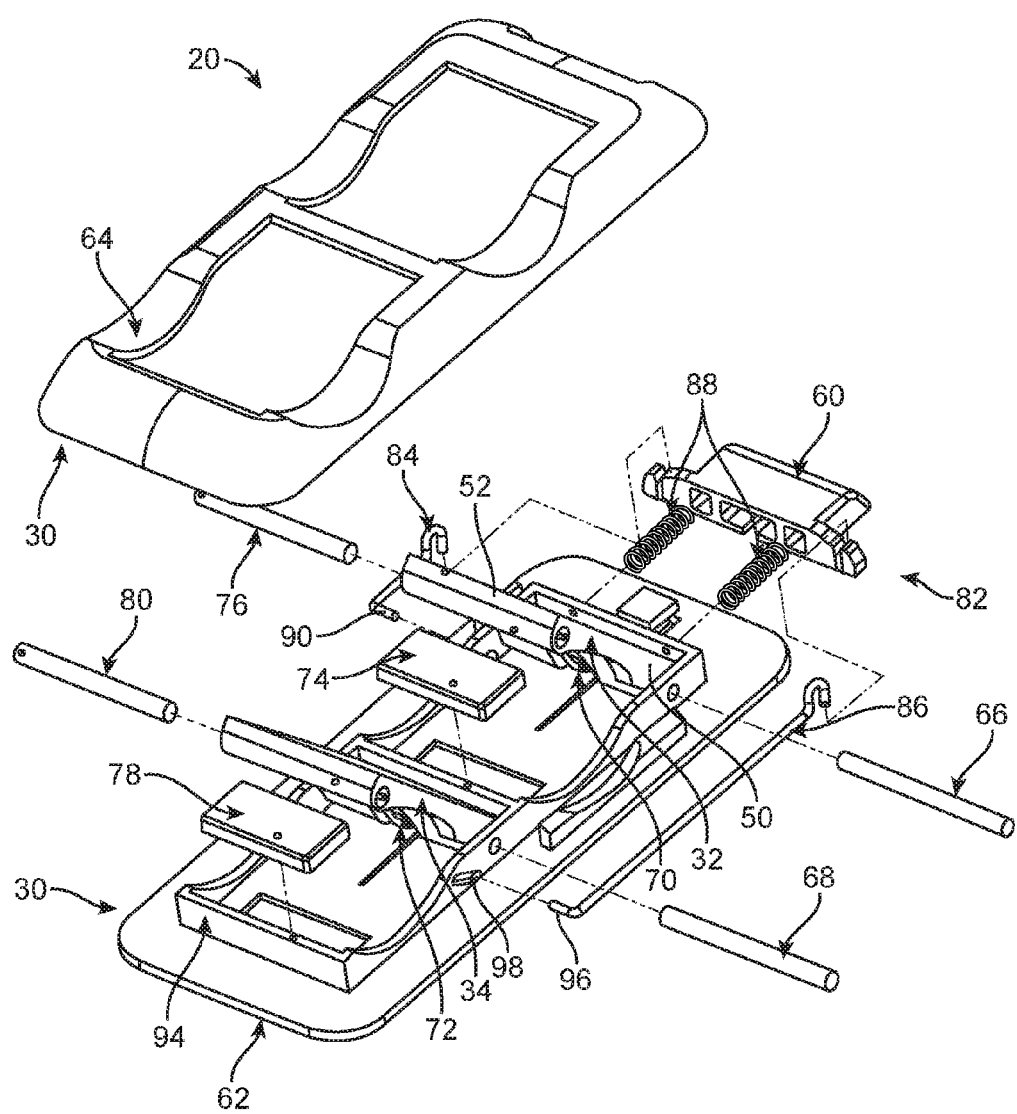
FIG. 3A is a perspective, exploded view of the handling apparatus of FIG. 1A.
Figure 3B:
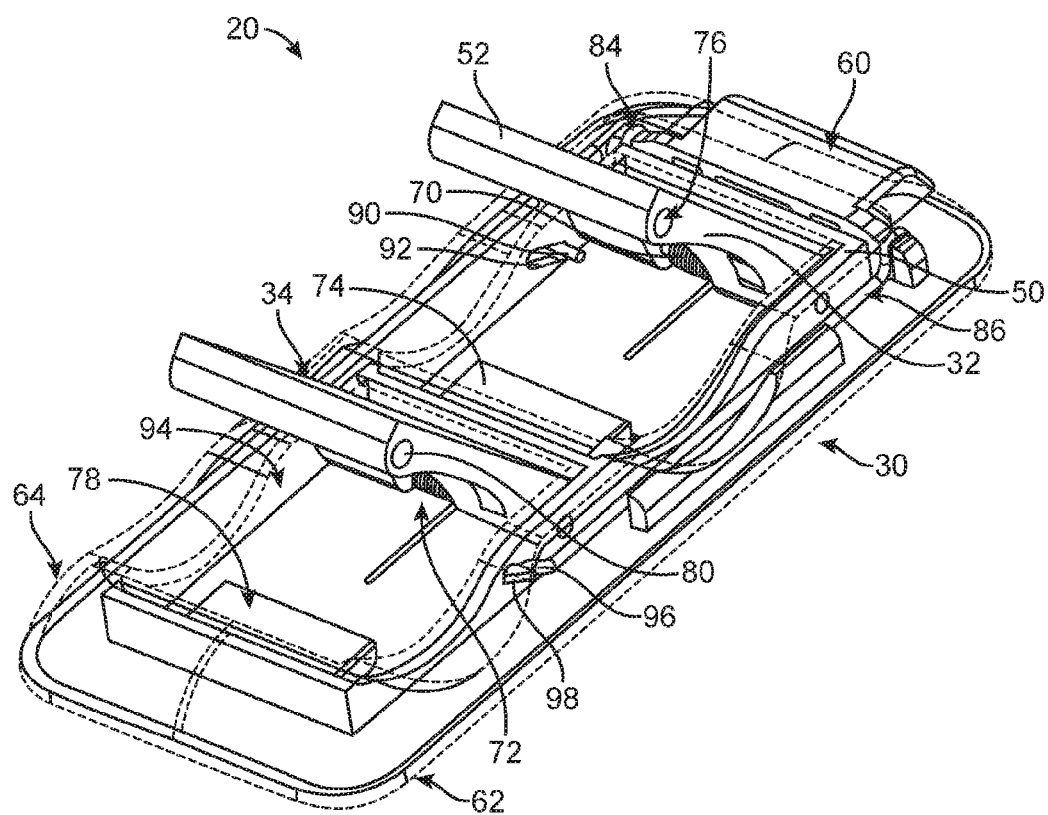
FIG. 3B is an enlarged perspective view of the handling apparatus of FIG. 1A with portions shown transparent.

For example, and as shown in greater detail in FIGS. 3A and 3B, the base 30 can be formed by a floor 62 and a cover 64. The wing bodies 32, 34 are pivotably connected to the floor 62 by a pin 66, 68, respectively. A first biasing device 70 (e.g., a spring) is disposed between the floor 62 and the first wing body 32 for biasing the first wing body 32 toward the deployed state. Similarly, a second biasing device 72 is disposed between the floor 62 and the second wing body 34 for biasing the second wing body 34 toward the deployed state.

A first magnet 74 is mounted to the floor 62 at a location corresponding with a location of the free end 52 of the first wing body 32 in the retracted state. A metal body 76 is assembled to the first wing body 32 at or proximate the free end 52. With this construction, magnetic attraction between the magnet 74 and the metal body 76 retains the first wing body 32 in the retracted state. In other embodiments, an arrangement of the magnet 74 and the metal body 76 can be reversed (i.e., the magnet 80 is carried by the first wing body 32). A second magnet 78 is mounted to the floor 62 at a location for promoting a similar magnetic interface with a metal body 80 carried by the second wing body 34.

A release mechanism 82 (referenced generally in FIG. 3A) is further included for facilitating user-prompted release of the wing bodies 32, 34 from the retracted state. The release mechanism 82 includes a first arm 84, a second arm 86, the button 60 and one or more springs 88 (or other biasing device). The first arm 84 is mounted to and extends from the button 60, terminating at a leading end 90. As best seen in FIG. 3B, the leading end 90 is slidably received within a first slot 92 formed by a flange 94 of the floor 62. For ease of understanding, the cover 64 is drawn in phantom in FIG. 3B. An axis of the first slot 92 is oblique with respect to a major plane of the floor 62, and is located proximate the fixed end 50 of the first wing body 32 upon final assembly. The second arm 86 is mounted to and extends from the button 60 (opposite a location of the first arm 84), and terminates at a leading end 96. The leading end 96 is slidably received within a second slot 98 formed in the flange 94 proximate the fixed end 54 of the second wing body 34 and extending at angle oblique to the major plane of the floor 62. The button 60 is slidably coupled to the base 30 (e.g., between the floor 62 and the cover 64), and is biased to a normal or neutral position (relative to the base 30) by the spring(s) 88 as shown in FIG. 3B.

To release the wing bodies 32, 34 from the retracted state, a user applies a manually pressing force on to the button 60. This force causes the button 60, and thus the attached arms 84, 86, to simultaneously slide relative to the base 30, thus moving or sliding the leading ends 90, 96 within the corresponding slot 92, 98. The oblique orientation of the slots 92, 98 (relative to the base 30) is such that as the leading ends 90, 96 slide "upwardly" along the corresponding slot 92, 98, a lifting force is applied to the corresponding wing body 32, 34 with just enough movement to break the magnetic attraction at the corresponding magnet/metal body 74/76, 78/80 so that the wing bodies 32, 34 simultaneously spring open to the deployed state.

Figure 4A:
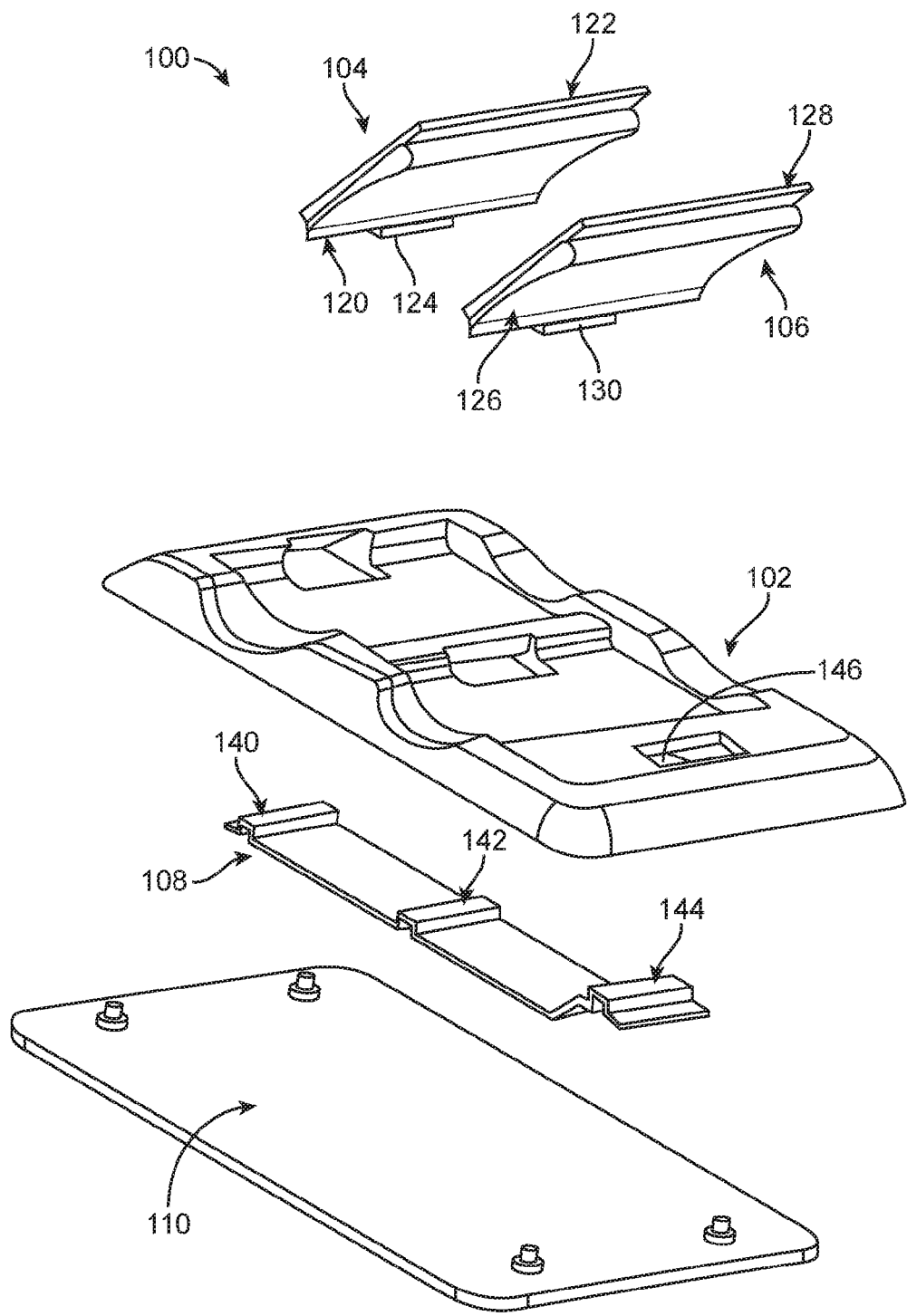
FIG. 4A is a perspective, exploded view of another handling apparatus in accordance with principles of the present disclosure.
Figure 4B:
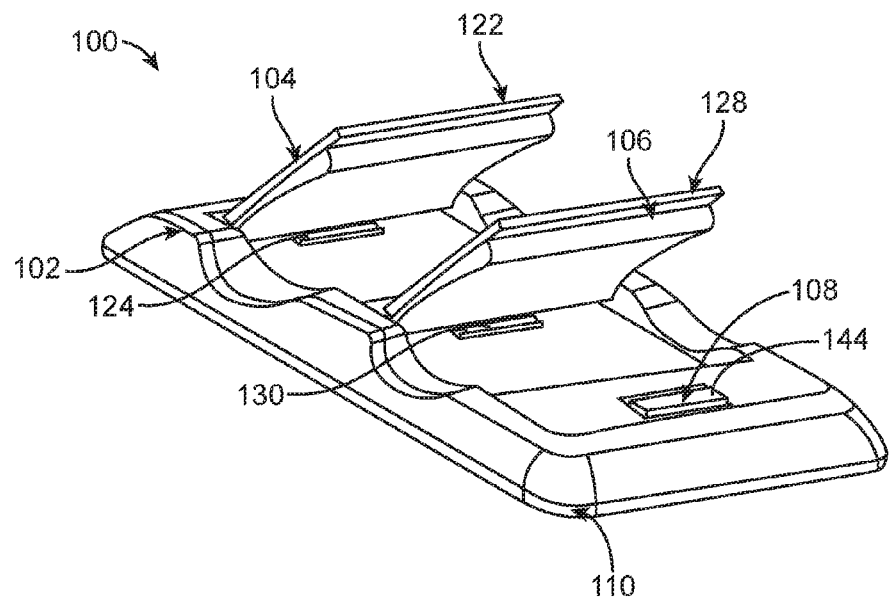
FIG. 4B is a perspective view of the handling apparatus of FIG. 4A upon final assembly.
Figure 4C:
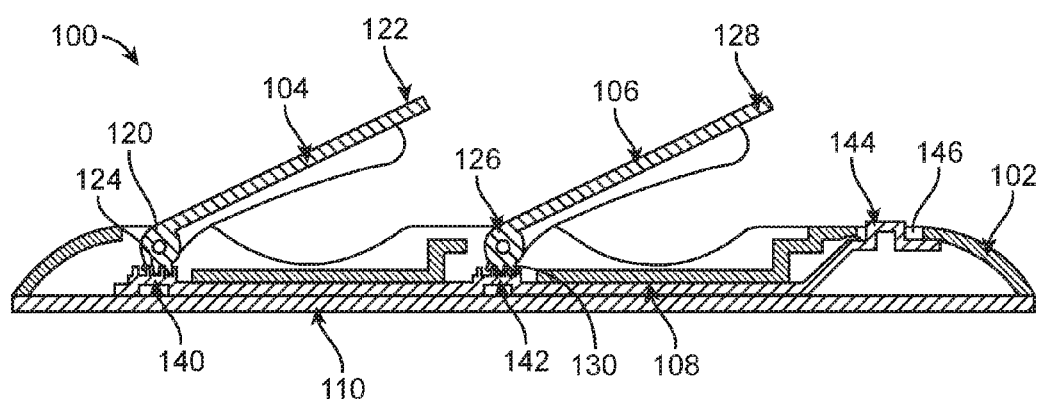
FIG. 4C is a simplified cross-sectional view of the handling apparatus of FIG. 4B.

Another handling apparatus 100 is shown in FIGS. 4A-4C, and includes a base 102 pivotably maintaining first and second wing bodies 104, 106 that can be akin to any of the descriptions of the present disclosure. In addition, the handling apparatus includes an actuator plate 108 and a floor 110.

The first wing body 104 defines a fixed end 120 that is pivotably connected to the base 102, and a free end 122 opposite the fixed end 120. A toothed surface 124 is formed at the fixed end 120. Similarly, the second wing body 106 defines a fixed end 126 that is pivotably connected to the base 102, and a free end 128 opposite the fixed end. A toothed surface 130 is formed at the fixed end 126.

The actuator plate 108 is sized and shaped for slidable assembly between the base 102 and the floor 110, and includes or defines a first engagement region 140, a second engagement region 142, and a handle 144. The engagement regions 140, 142 form or carry teeth configured to interface with the toothed surface 124, 130 of a corresponding one of the wing bodies 104, 106 in a meshed, gear-like fashion.

Upon final assembly, and as best shown in FIG. 4C, the actuator plate 108 is disposed within the base 102, slidably supported against the floor 110. The first engagement region 140 interfaces with the toothed surface 124 of the first wing body 104, and the second engagement region interfaces with the toothed surface 130 of the second wing body 106. The handle 144 is exteriorly exposed relative to the base 102 via an aperture 146. With this construction, a user can readily and simultaneously transition the wing bodies 104, 106 between retracted and deployed states by a sliding or actuation force manually applied at the handle 144. More particularly, the applied force causes the actuator plate 108 to slide relative to the base 102 (and thus the wing bodies 104, 106) in a selected direction, with the gear-like interface at the toothed surfaces 124, 130 causing the wing bodies 104, 106 to pivot or rotate relative to the base 102. In some embodiments, the base 102 and/or actuator plate 108 can incorporate various features that selectively lock the actuator plate 108 relative to the base 102 (and thus the wing bodies 104, 106 at a corresponding rotational orientation).

Figure 5A:
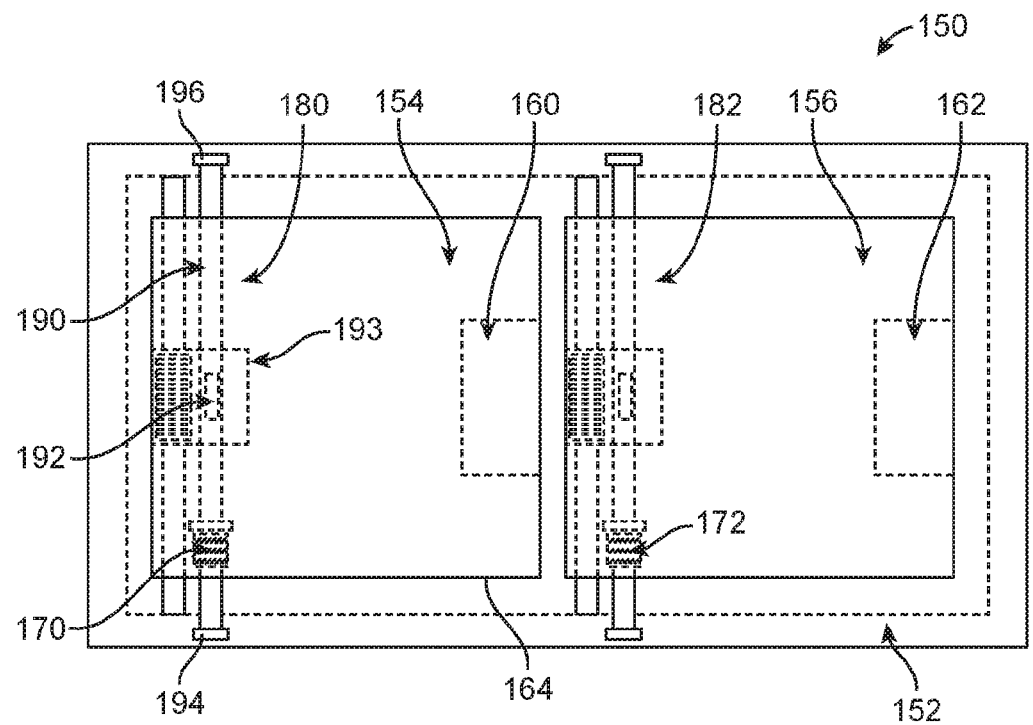
FIG. 5A is a simplified top view of another handling apparatus in accordance with principles of the present disclosure.
Figure 5B:
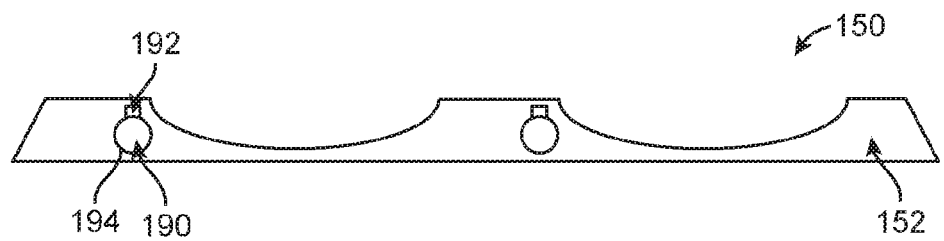
FIG. 5B is a simplified side view of portions of the handling apparatus of FIG. 5A.

Portions of another handling apparatus 150 are shown in simplified form in FIGS. 5A and 5B. The handling apparatus 150 includes a base 152, a first wing body 154 and a second wing body 156 that can be akin to any of the descriptions of the present disclosure. Complementary magnetic assemblies 160, 162 (referenced generally) are provided for selectively retaining the corresponding wing body 154, 156 in the retracted state. For example, the first complementary magnetic assembly 160 can include a magnet or a metal body is carried by the first wing body 154 at the free end 164 thereof, and a complementary magnet or metal body is carried by the base 152 at a location aligned with the free end of the first wing body 154 in the retracted state (in other words, a magnet is provided at one or both of the base 152 and the first wing body 154). The second complementary magnetic assembly 162 can have a similar construction.

The handling apparatus 150 further includes a biasing device 170, 172 (e.g., a spring) associated with a respective one of the wing bodies 154, 156 for biasing the corresponding wing body 154, 156 toward the deployed state. Further, a release mechanism 180, 182 (referenced generally) is associated with a respective one of the wing bodies 154, 156. The release mechanisms 180, 182 can be identical such that the following description of the first release mechanism 180 applies equally to the second release mechanism 182. The first release mechanism 180 includes a rod 190 carrying or forming a nub 192, along with a tapered groove 193 formed in an inner face of the first wing body 154. The rod 190 is slidably mounted to the base 152, and terminates at opposing button ends 194, 196. The button ends 194, 196 are exteriorly exposed relative to base 152. The nub 192 and the tapered groove 193 have a complementary configuration, with the nub 192 nesting within the tapered groove 193. In a normal arrangement of the rod 190 relative to the base 152 (i.e., the arrangement of FIG. 5A), the nub 192 is located within a deepest region of the tapered groove 193, such that the first wing body 154 nests against the base 152 with the complementary magnetic assembly 160 maintaining the first wing body 154 in the retracted state. To release the first wing body 154 (and thus permit the biasing device 170 to automatically transition the first wing body 154 to the deployed state), a user applies a manually pressing force on to either of the button ends 194, 196. This force causes the rod 190 to slide relative to the base 152, thus moving or sliding the nub 192 within the tapered groove 193. The shape of the tapered groove 193 is such that as the nub 192 is moved, a lifting force is applied to the first wing body 154 with just enough movement to break the magnetic attraction at the complementary magnetic assembly 160 so that the first wing body 154 springs open to the deployed state.

Figure 6A:
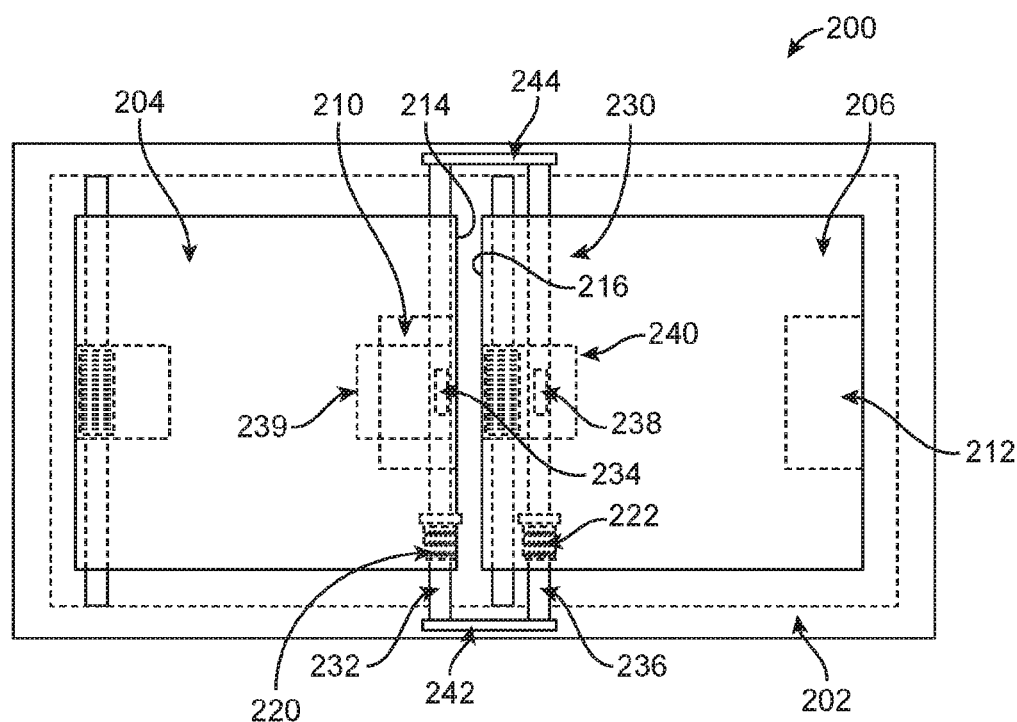
FIG. 6A is a simplified top view of another handling apparatus in accordance with principles of the present disclosure.
Figure 6B:
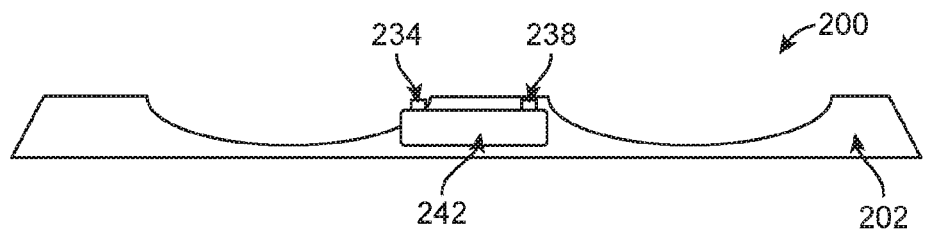
FIG. 6B is a simplified side view of portions of the handling apparatus of FIG. 6A.

Portions of another embodiment handling apparatus 200 are shown in simplified form in FIGS. 6A and 6B. The handling apparatus 200 can be akin to the handling apparatus 150 (FIGS. 5A and 5B), and includes a base 202, a first wing body 204 and a second wing body 206 that can be akin to any of the descriptions of the present disclosure. Complementary magnetic assemblies 210, 212 (referenced generally) are provided for selectively retaining the corresponding wing body 204, 206 in the retracted state. For example, the first complementary magnetic assembly 210 can include a magnet or a metal body that is carried by the first wing body 204 at the free end 214 thereof, and a complementary magnet or metal body that is carried by the base 202 at a location aligned with the free end of the first wing body 204 in the retracted state (in other words, a magnet is provided at one or both of the base 202 and the first wing body 204). The second complementary magnetic assembly 212 can have a similar construction.

The handling apparatus 200 further includes a biasing device 220, 222 (e.g., a spring) associated with a respective one of the wing bodies 204, 206 for biasing the corresponding wing body 204, 206 toward the deployed state. In some embodiments, the first biasing device 220 acts on the free end 214 of the first wing body 204, whereas the second basing device 222 acts on the fixed end 216 of the second wing body 206. Further, a release mechanism 230 (referenced generally) is associated with the wing bodies 204, 206. The release mechanism 230 includes a first rod 232 carrying or forming a nub 234, a second rod 236 carrying a nub 238, a tapered groove 239 formed in an inner face of the first wing body 204, and a tapered groove 240 formed in an inner face of the second wing body 206. The rods 232, 236 are slidably mounted to the base 202. Corresponding ends of the rods 232, 236 are interconnected by an arm 242, 244 that is exteriorly exposed relative to base 202. The nub 234 of the first rod 232 and the tapered groove 239 of the first wing body 204 have a complementary configuration, with the nub 234 nesting within the tapered groove 239. The nub 238 of the second rod 236 has a similar relationship with the tapered groove 240 of the second wing body 206. In a normal arrangement of the rods 232, 236 relative to the base 202 (i.e., the arrangement of FIG. 6A), the nubs 234, 238 are located within a deepest region of the corresponding tapered groove 239, 240, such that the wing bodies 204, 206 nest against the base 202 with the complementary magnetic assemblies 210, 212 maintaining the wing bodies 204, 206 in the retracted state. To release the wing bodies 204, 206, a user applies a manually pressing force on to either of the arms 242, 244. This force causes the rods 232, 236 to simultaneously slide relative to the base 202, thus moving or sliding the nubs 234, 238 within the corresponding tapered groove 239, 240. The shape of the tapered grooves 239, 240 is such that as the nubs 234, 238 are moved, a lifting force is applied to the corresponding wing body 204, 206 with just enough movement to break the magnetic attraction at the corresponding complementary magnetic assembly 210, 212 so that the wing bodies 204, 206 simultaneously spring open to the deployed state.

Figure 7A:
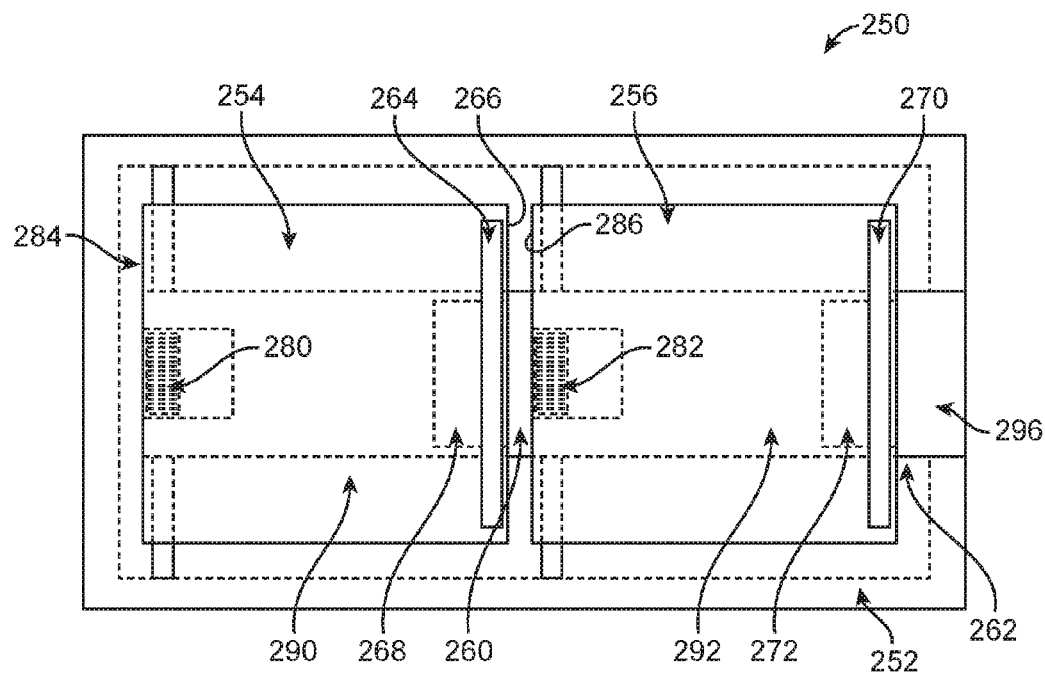
FIG. 7A is a simplified top view of another handling apparatus in accordance with principles of the present disclosure.
Figure 7B:
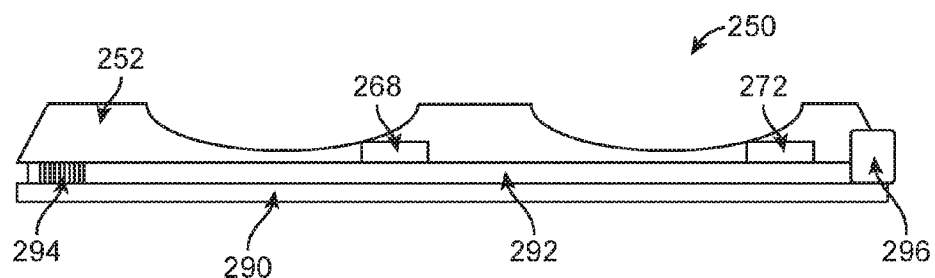
FIG. 7B is a simplified side view of portions of the handling apparatus of FIG. 7A.

Portions of another embodiment handling apparatus 250 are shown in simplified form in FIGS. 7A and 7B. The handling apparatus 250 includes a base 252, a first wing body 254 and a second wing body 256 that can be akin to any of the descriptions of the present disclosure. Complementary magnetic assemblies 260, 262 (referenced generally) are provided for selectively retaining the corresponding wing body 254, 256 in the retracted state. For example, the first complementary magnetic assembly 260 can include a metal body 264 (e.g., a steel pin) carried by the first wing body 254 at a free end 266 thereof, and a magnet 268 is carried within the base 252 (as described in greater detail below) at a location generally aligned with the free end 266 in the retracted state, or vice-versa. The second complementary magnetic assembly 262 can have a similar construction, including a metal body 270 carried by the second wing body 254 and a magnet (or metal body) 272 carried within the base 252 as described in greater detail below.

The handling apparatus 250 further includes a biasing device 280, 282 (e.g., a spring) associated with a respective one of the wing bodies 254, 256 for biasing the corresponding wing body 254, 256 toward the deployed state. In some embodiments, the first biasing device 280 acts on a fixed end 284 of the first wing body 254, and the second biasing device 282 acts on a fixed end 286 of the second wing body 256.

The handling apparatus 250 further comprises a release mechanism 290 (referenced generally) that includes an actuator plate 292 and a return element 294. The actuator plate 292 is slidably disposed within the base 252, and forms a handle 296. The first and second magnets 268, 272 are attached to the actuator plate 292. The handle 296 extends through, and is accessible exteriorly of, the base 252. The return element 294 is disposed in the base 252 and interfaces with an end of the actuator plate 292 opposite the handle 296. The return element 294 (e.g., a spring) is configured to bias the actuator plate 292 to the normal arrangement of FIG. 7B in which the magnets 268, 272 are aligned with the corresponding metal body 264, 270 of the first and second wing bodies 254, 256. In the normal arrangement of the release mechanism 290, then, the wing bodies 254, 256 are retained in the retracted condition. To release the wing bodies 254, 256, a user applies a manual pressing force on to the handle 296, causing the actuator plate 292 (and the magnets 268, 272 carried by actuator plate 292) to slide relative to the base 202. The magnets 268, 272 are transitioned away from the corresponding metal body 264, 272 a sufficient distance to break the magnetic attraction at the corresponding complementary magnetic assembly 260, 262 so that the wing bodies 254, 256 simultaneously spring open to the deployed state.

Figure 8A:
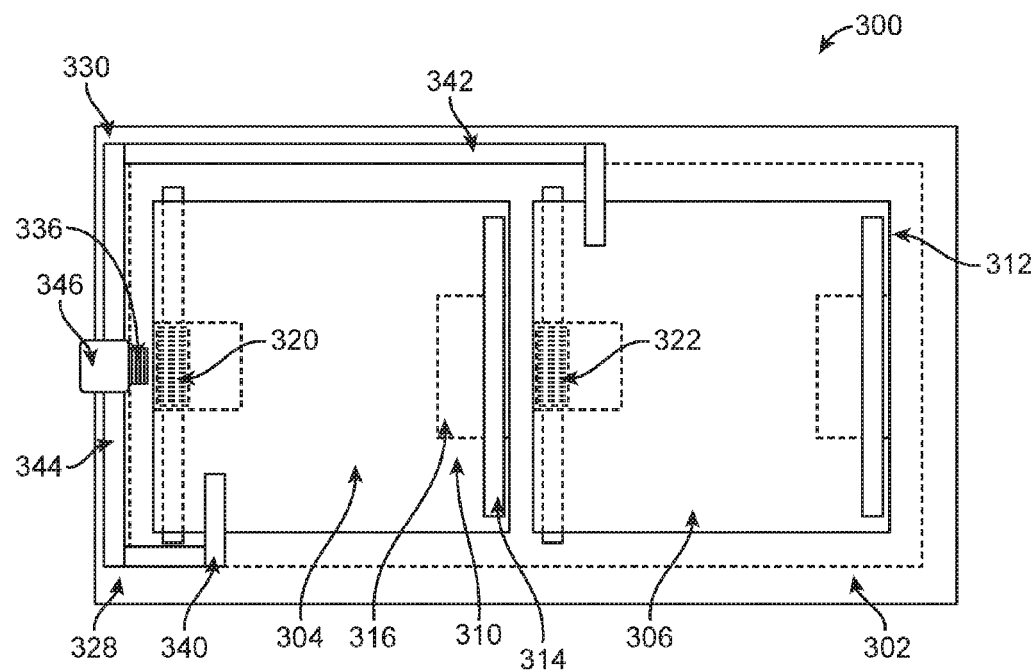
FIG. 8A is a simplified top view of another handling apparatus in accordance with principles of the present disclosure.
Figure 8B:
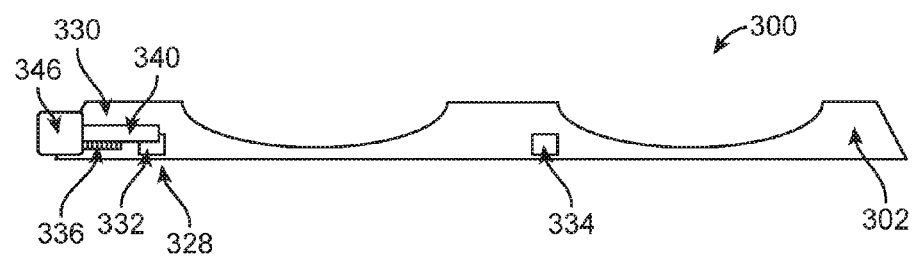
FIG. 8B is a simplified side view of portions of the handling apparatus of FIG. 8A.

Portions of another embodiment handling apparatus 300 are shown in simplified form in FIGS. 8A and 8B. The handling apparatus 300 includes a base 302, a first wing body 304 and a second wing body 306 that can be akin to any of the descriptions of the present disclosure. Complementary magnetic assemblies 310, 312 (referenced generally) are provided for selectively retaining the corresponding wing body 304, 306 in the retracted state. For example, the first complementary magnetic assembly 310 can include a magnet or a metal body 314 that is carried by the first wing body 304, and a complementary magnet or metal body 316 that is carried by the base 302 at a location generally aligned with the metal body 314 in the retracted state, or vice-versa. The second complementary magnetic assembly 312 can have a similar construction.

The handling apparatus 300 further includes a biasing device 320, 322 (e.g., a spring) associated with a respective one of the wing bodies 304, 306 for biasing the corresponding wing body 304, 306 toward the deployed state.

The handling apparatus 300 further comprises a release mechanism 328 (referenced generally) for selectively releasing the wing bodies 304, 406 from the retracted state. The release mechanism 328 includes an arm assembly 330, first and second bearing members 332, 334, and a return element 336.

The arm assembly 330 is slidably disposed within the base 302, and includes or provides a first lever arm 340, a second lever arm 342, and a cross-arm 344. The first and second lever arms 340, 342 are interconnected by the cross-arm 344. The first lever arm 340 projects from the cross-arm 344 and interfaces with an inner surface of the first wing body 304. Similarly, the second lever arm 342 projects from the cross-arm 344 and interfaces with an inner surface of the second wing body 306. The cross-arm 344 carries or forms a button or handle 346 that extends through, and is accessible exteriorly of, the base 302.

The first bearing member 332 is attached to or formed by the base 302, and is positioned to slidably receive the first lever arm 340. The first bearing member 332 can have a wedge-like shape, configured to guide the first lever arm 340 toward the first wing body 304 (i.e., upward relative to the orientation of FIG. 8B) as the first lever arm 340 is directed along the first bearing member 332 (i.e., moved rightward relative to the orientation of FIGS. 8A and 8B). Similarly, the second bearing member 334 is attached to or formed by the base 302, and is positioned to slidably receive the second lever arm 342. The second bearing member 334 can have a wedge-like shape, configured to guide the second lever arm 342 toward the second wing body 306 as the second lever arm 342 is directed along the second bearing member 334.

The return element 336 is disposed in the base 302 and interfaces with an end cross-arm 344. The return element 336 (e.g., a spring) is configured to bias the arm assembly 330 to the normal arrangement of FIGS. 8A and 8B in which the complementary magnetic assemblies 310, 312 retain the wing bodies 304, 306 in the retracted condition. To release the wing bodies 304, 306, a user applies a manual pressing force on to the button 346, causing the arm assembly 330 to slide relative to the base 302. With this sliding movement, the bearing members 332, 334 guide the corresponding lever arms 340, 342 upwardly into forced engagement with the respective wing body 304, 306 wedging the wing bodies 304, 306 a sufficient distance to break the magnetic attraction at the corresponding complementary magnetic assembly 310, 312 so that the wing bodies 304, 306 simultaneously spring open to the deployed state.

Figure 9A:
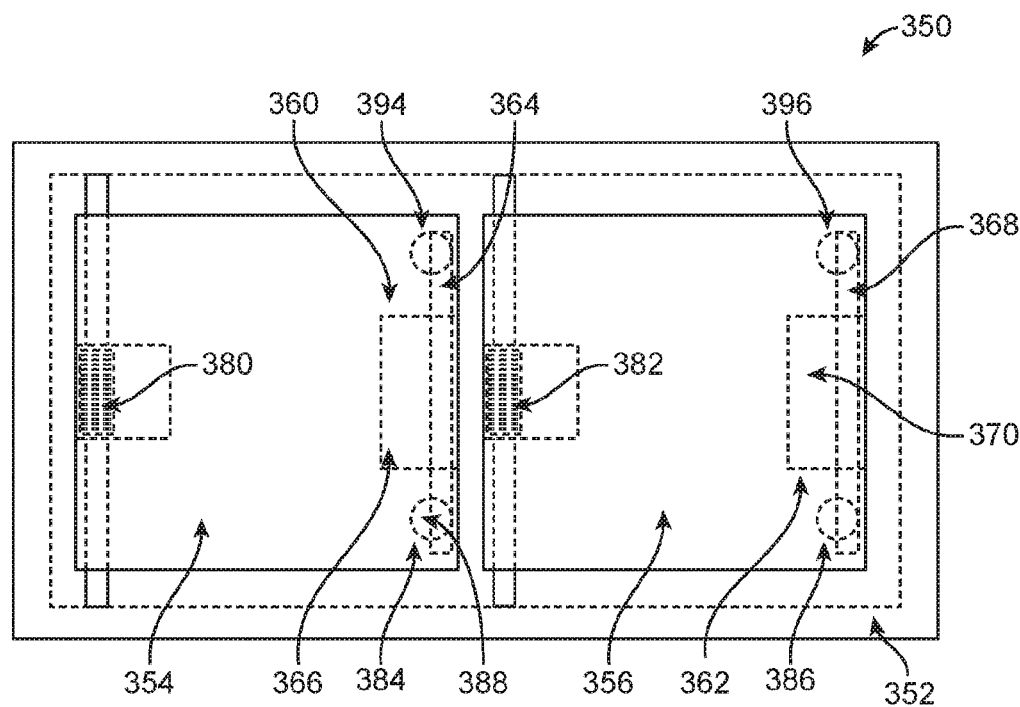
FIG. 9A is a simplified top view of another handling apparatus in accordance with principles of the present disclosure.
Figure 9B:
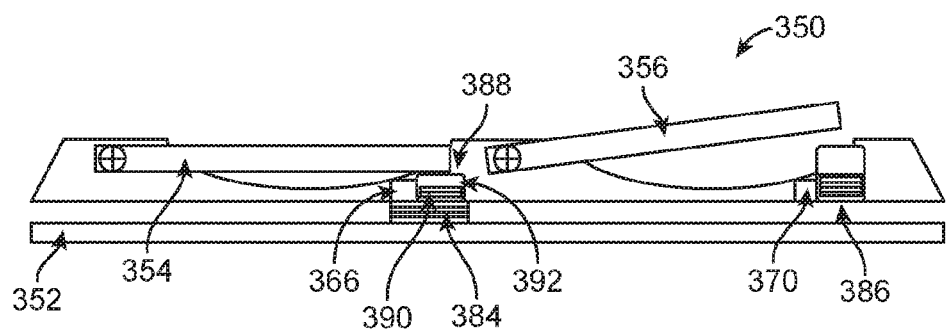
FIG. 9B is a simplified side view of portions of the handling apparatus of FIG. 9A.

Portions of another embodiment handling apparatus 350 are shown in simplified form in FIGS. 9A and 9B. The handling apparatus 350 includes a base 352, a first wing body 354 and a second wing body 356 that can be akin to any of the descriptions of the present disclosure. Complementary magnetic assemblies 360, 362 (referenced generally) are provided for selectively retaining the corresponding wing body 354, 356 in the retracted state. For example, the first complementary magnetic assembly 360 can include a metal body 364 (e.g., a steel pin) carried by the first wing body 354, and a magnet 366 carried within the base 352 at a location generally aligned with the metal body 364 in the retracted state, or vice-versa. The second complementary magnetic assembly 362 can have a similar construction, including a metal body 368 carried by the second wing body 354 and a magnet (or metal body) 370 carried within the base 352.

The handling apparatus 350 further includes a biasing device 380, 382 (e.g., a spring) associated with a respective one of the wing bodies 354, 356 for biasing the corresponding wing body 354, 356 toward the deployed state.

The handling apparatus 350 further comprises first and second release mechanisms 384, 386 (referenced generally) carried by the base 352 and associated with a respective one of the magnetic assemblies 360, 262. The release mechanisms 384, 386 can be identical, such that the following description of the first release mechanism 384 applies equally to the second release mechanism 386. The release mechanism 384 can be akin to a well-known writing pen click mechanism, and generally includes a push button 388, a spring 390 and a cam assembly 392 (referenced generally). The cam assembly 392 maintains, and is acted upon by, the spring 390. In particular, the cam assembly 392 can transition between a compressed arrangement (shown for the first release mechanism 384 in FIG. 9B) and an expanded arrangement (shown for the second release mechanism 386 in FIG. 9B), and is selectively locked when the compressed or expanded arrangement is attained. For example, the cam assembly 392 includes locking features (not shown) that temporarily hold the cam assembly 392 in the compressed arrangement. A downward force applied to the push button 388 causes the locking features to disengage, and a force of the spring 390 is then permitted to transition the release mechanism 384 to the expanded arrangement. Conversely, when in the expanded arrangement, a downward force applied to the push button 388 sufficient to overcome a spring force of the spring 390 directs the cam assembly 392 to the compressed arrangement at which the locking features are then engaged. In some embodiments, an additional release mechanism can be provided for each of the magnetic assemblies (e.g., the third and fourth release mechanisms 394, 396 identified in FIG. 9A).

With the above descriptions in mind, the first wing body 354 is transitioned from the deployed state to the retracted state by manually pivoting or rotating the first wing body 354 to the deployed state. Manually pushing the first wing body 354 toward the base 352 (e.g., downwardly relative to the orientation of FIG. 9B) will compress the first release mechanism 384 (and the optional third release mechanism 394 where provided) to the compressed arrangement, allowing the first magnetic assembly 360 to magnetically hold the first wing body 354 in the retracted state. To release the first wing bodies 354, a user applies a manual pressing force on to the first wing body 354 in a region of the free end, causing the first release mechanism 384 (and the optional third release mechanism 394 where provided) to self-transition to the expanded arrangement that in turn moves the free end of the first wing body 354 (and thus the metal body 364) away from the magnet 366 a sufficient distance to break the magnetic attraction at the first magnetic assembly 360 so that the first wing body 354 springs open to the deployed state. The second wing body 356 can be similarly operated.

Figure 10:
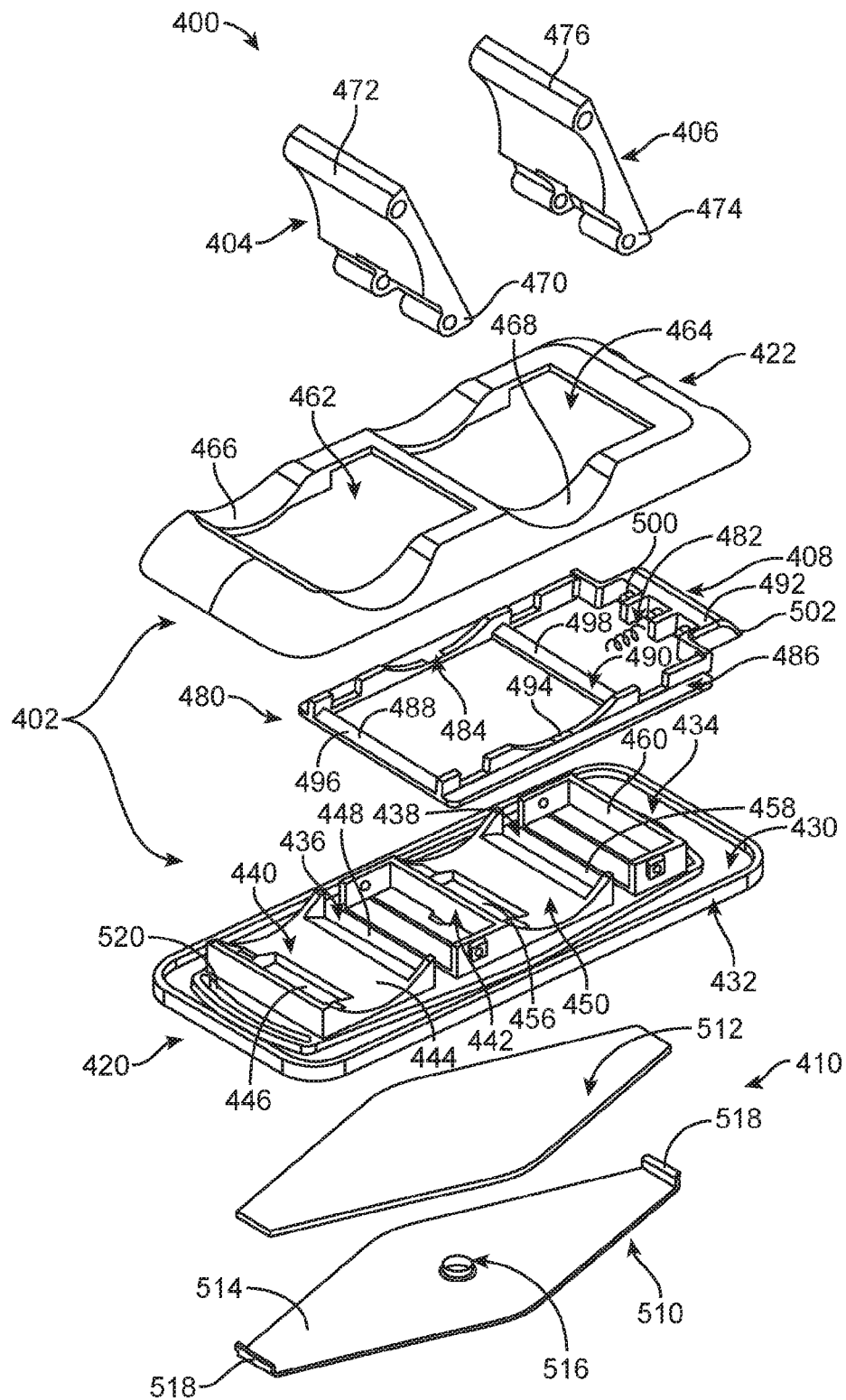
FIG. 10 is a perspective, exploded view of another handling apparatus in accordance with principles of the present disclosure.

Another embodiment of a handling apparatus 400 in accordance with principles of the present disclosure is shown in FIG. 10. The handling apparatus 400 includes a base 402, a first wing body 404, a second wing body 406, a release mechanism 408, and an optional mounting subassembly 410. In addition, the handling apparatus 400 includes first and second complementary magnetic assemblies (not shown) as described below. Further, the handling apparatus 400 includes a biasing device (not shown, but, for example, a spring) associated with a respective one of the wing bodies 404, 406 for biasing the corresponding wing body 404, 406 toward the deployed state as with previous embodiments.

The base 402 can be akin to any of the embodiments described above and includes a floor 420 and a cover 422. The floor 420 includes or defines a bottom wall 430, a skirt 432, and support framework 434 (referenced generally). The skirt 432 is defined along a perimeter of the bottom wall 430 and is configured for assembly to a perimeter of the cover 422. The framework 434 projects from and is supported by the bottom wall 430 and defines first and second wing regions 436, 438. The first wing region 436 includes a platform 440 and a coupling frame 442. A receiving surface 444 of the platform 440 can have the arcuate or curved shape as shown. A pocket 446 is formed in the platform 440 and is open to the receiving surface 444 for reasons made clear below. The coupling frame 442 is configured for pivotably maintaining the first wing body 404 as described below. A slot 448 is defined through the first wing region 436 between the platform 440 and the coupling frame 442. The second wing region 438 can have a substantially identical construction in some embodiments, and includes a platform 450 and a coupling frame 452. In some embodiments, the platform 450 of the second wing region 438 can be contiguous with the coupling frame 442 of the first wing region 438. Regardless, the platform 450 has a curved receiving surface through which a pocket 456 is formed. A slot 458 is defined between the platform 450 and the coupling frame 452. The framework 434 terminates at an end wall 460 of the coupling frame 452.

The cover 422 can assume any of the forms described above and generally forms first and second openings 462, 464 sized to receive a respective one of the wing bodies 404, 406, as well as contours or grooves 466, 468 adjacent the openings 464, 464.

The first and second wing bodies 404, 406 can assume any of the forms or constructions provided in the present disclosure. The first wing body 404 defines a fixed end 470 opposite a free end 472. Similarly, the second wing body 406 defines a fixed end 474 opposite a free end 476. The first wing body 404 is configured for pivotable mounting to the first wing region 438 of the framework 434, for example by a pin (not shown) connecting the fixed end 470 to opposing walls of the coupling frame 442. The fixed end 474 of the second wing body 406 can also be pivotably mounted to the coupling frame 452 of the second wing region 440 by a pin (not shown)

Though not shown in FIG. 10, the complementary magnetic assemblies can assume any of the forms described above, and are generally configure to selectively maintain the wing bodies 404, 406 in a retracted state. For example, a first complementary magnet assembly can include a metal body (not shown), for example a steel pin, carried by the first wing body 404 adjacent the free end 472, and a magnet (not shown) disposed within the pocket 446 of the first wing region platform 440 (that is otherwise generally aligned with the free end 472 in the retracted state, or vice-versa. A second complementary magnetic assembly can have a similar construction, including a metal body or magnet (not shown) carried by the second wing body 406 adjacent the free end 476, and a magnet or metal body (not shown) disposed within the pocket 456 of the second wing region platform 450.

The release mechanism 408 includes a lift body 480 and a biasing member 482. The lift body 480 includes or defines opposing side members 484, 486, a first cross member 488, a second cross member 490, and a button body 492. A transverse spacing between the side members 484, 486 is commensurate with (i.e., slightly greater than) a transverse width of the framework 434. The side member 484, 486 can each form a depression 494 having a shape generally corresponding with a shape of the receiving surface 444 of the second wing region platform 450. Further, one or more notches can be formed in the side members 484, 486 to facilitate mounting of the wing bodies 404, 406 to the framework 434 as described above. The first cross member 488 extends between the side members 484, 486, and is sized and shaped to be slidably received within the slot 448 of the first wing region 438. The second cross member 490 also extends between the side members 484, 486, and is configured to be slidably received within the slot 458 of the second wing region 440. The cross member 488, 490 can have a similar construction, each defining a wedge face 496, 498. Finally, the button body 492 defines in inner surface 500 and a button surface 502.

The biasing member 482 is generally configured to bias the lift body 480 to a neutral position relative to the base 402 upon final assembly. In some embodiments, for example, the biasing member 482 includes one or more springs arranged between the end wall 460 of the framework 434 and the inner surface 500 of the button body 492 for reasons made clear below.

The optional mounting sub-assembly 410, where provided, facilitates mounting of the handling apparatus 400 to a mobile electronic device (e.g., cell phone) and can include a swivel plate 510 and an adhesive sheet 512. The swivel plate 510 is configured for assembly to the base 402 and can include a panel 514, a collar 516 and opposing tabs 518. The panel 514 can have various shapes and sizes that may or may not be implicated by the drawings. In more general terms, a footprint of the panel 514 is less than or approximates a footprint of the floor 420. The collar 516 and opposing tabs 518 projects from the panel 514 and are configured for connecting the swivel plate 510 to the base 402. For example, in one non-limiting embodiment, the bottom wall 430 of the floor 420 forms a cavity (hidden in the view of FIG. 10) sized and shaped to receive the panel 514. Further, a hole (hidden) is formed through the bottom wall 430 within which the collar 516 is rotatably received. Finally, the opposing slots 520 (one of which is visible in FIG. 10) are formed through the bottom wall 430 each sized to slidably receive a corresponding one of the tabs 518. With construction, the swivel plate 510 can rotate relative to the base 402 (and vice-versa) about an axis of the collar 516, with the tabs 518 sliding within the corresponding slot 520 in a manner permitting some degree of rotation. Other assembly techniques are equally acceptable. Regardless, the adhesive sheet 512 is carried at an outer face of the panel 514 (i.e., opposite the base 402) and can assume various forms appropriate for temporary connection or mounting to a mobile electronic device (e.g., a film carrying pressure sensitive adhesive). In other embodiments, the mounting sub-assembly 412 can be omitted.

Figure 11A:
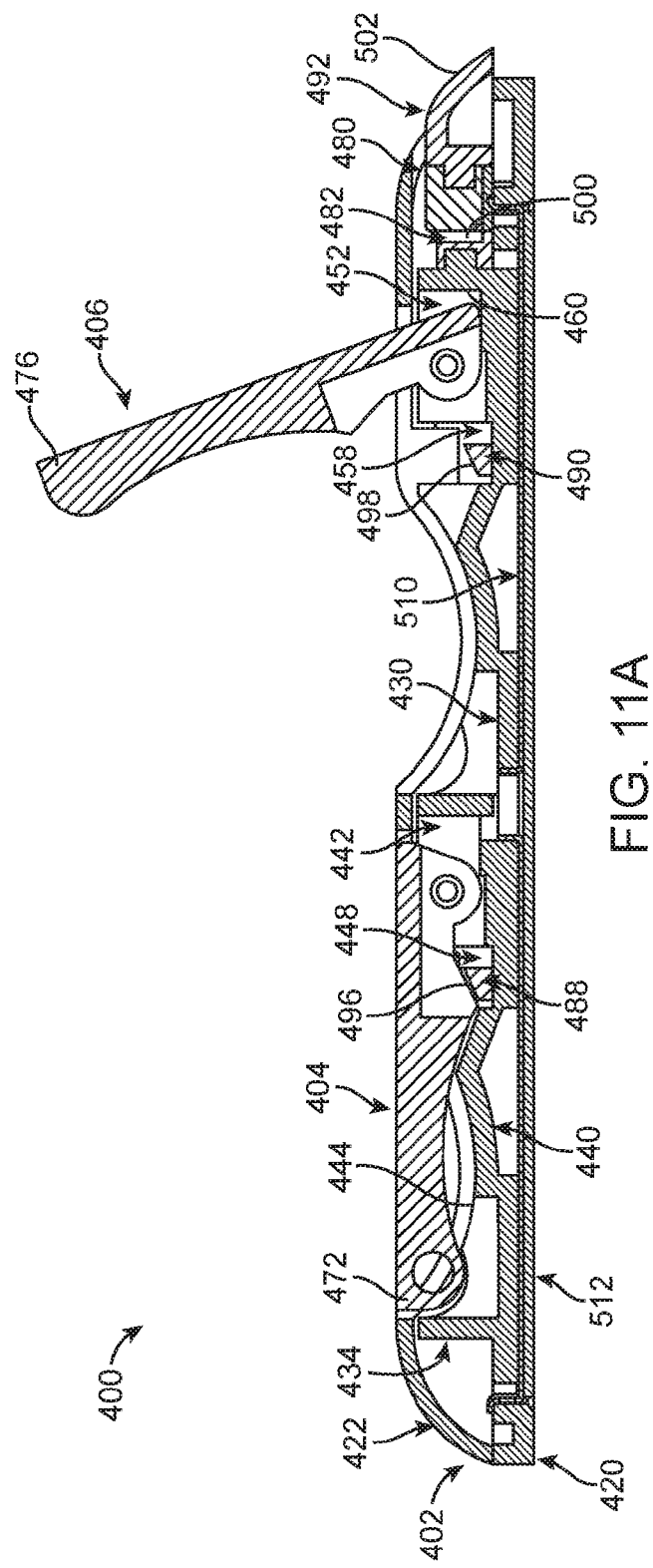
FIG. 11A is a cross-sectional view of the handling apparatus of FIG. 10 upon final assembly.

Final assembly of the handling apparatus 400 is shown in FIG. 11A. The first wing body 404 is pivotably mounted to the first wing region coupling frame 442 as described above. As point of reference, the first wing body 404 is shown in the retracted state in FIG. 11A, pivoted relative to the base 402 such that the free end 472 nests within the cover 422 and into the receiving surface 444 of the platform 440. The complementary magnetic assembly (not shown) magnetically retains the first wing body 404 in the retraced state. The second wing body 406 is pivotably mounted to the second wing region coupling frame 452, and is shown in the deployed state whereby the free end 476 is located away from or outside of the cover 422. The lift body 480 is slidably disposed on the bottom wall 430 of the floor 420. The button surface 502 of the button body 492 is located external the base 402 and is accessible by a user. The first cross member 488 extends across and is slidably disposed within the slot 448 of the first wing region 436. The second cross member 490 extends across and is slidably disposed within the slot 458 of the second wing region 438. The biasing member 482 is arranged between the end wall 460 of the framework 434 and the inner surface 500 of the button body 492 so as to bias the lift body 480 to the neutral position shown. In the neutral position, the cross members 488, 490 do not overtly contact or engage the corresponding wing body 404, 406 in the retracted state. FIG. 11A also generally reflects connection of the adhesive sheet 512 to the swivel plate 510, and of the swivel plate 510 to the floor 420.

With the above descriptions in mind, the wing bodies 404, 406 can be simultaneously transitioned from the retracted state to the deployed state (e.g., relative to the arrangement of FIG. 11A, the first wing body 404 is in the retracted state and can be transitioned to the deployed state represented by the second wing body 406) by applying a pressing force on to the button surface 502 sufficient to overcome a biasing force of the biasing member 482. When a sufficient force is applied, the lift body 480 is caused to slide or move relative to the floor 420 and thus relative to the wing bodies 404, 406 (for example, leftward in the orientation of FIG. 11A). Movement of the lift body 480 brings the wedge face 496 of the first cross member 488 into contact with a surface of the first wing body 404. A lifting force is thus applied to the first wing body 404 with just enough movement to break the magnetic attraction at the complementary magnetic assembly (not shown) so that the first wing body 404 springs open to the deployed state. As a point of reference, were the second wing body 406 to be in the retracted state, movement of the lift body 480 would also bring the wedge face 498 of the second cross member 490 into contact with second wing body 406, resulting in the second wing body 406 springing open to the deployed state.

Figure 11B:
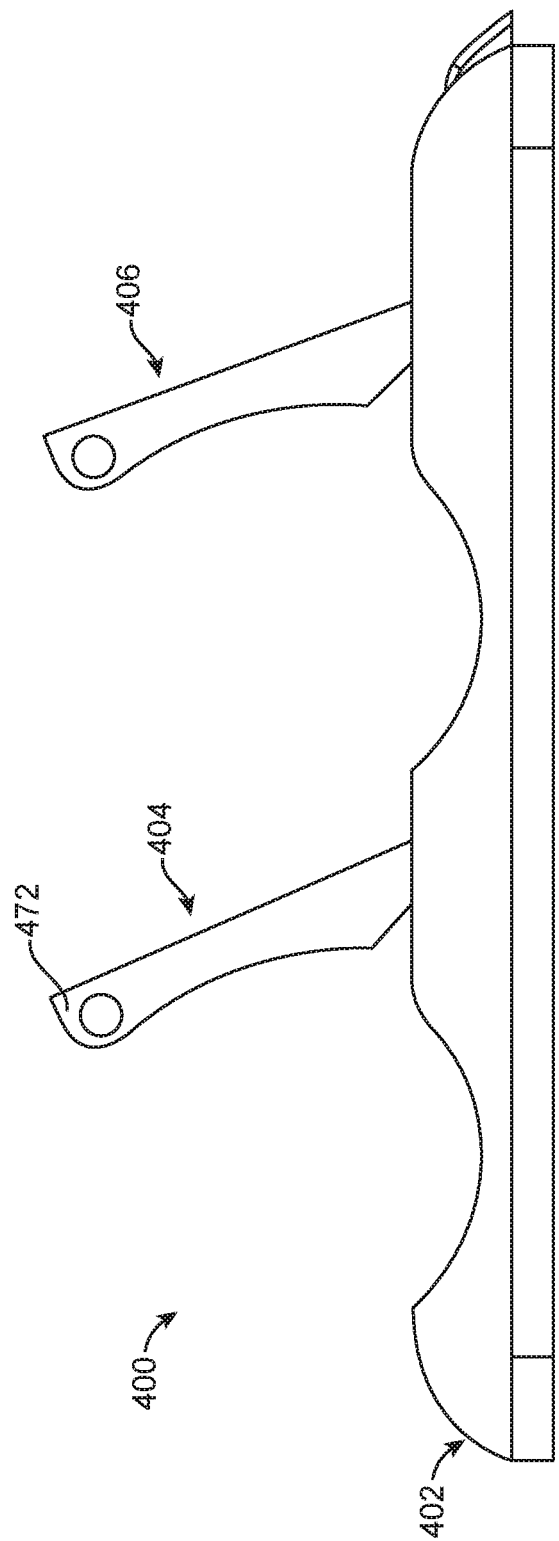
FIG. 11B is a side view of the handling apparatus of FIG. 10.

FIG. 11B illustrates both wing bodies 404, 406 in the deployed state. Manually pushing the free end 472 of the first wing body 404 toward the base 402 (e.g., downwardly relative to the orientation of FIG. 11B) transitions the first wing body 404 to the retracted state, with the corresponding magnetic assembly (not shown) magnetically holding the first wing body 404 in the retracted state. The second wing body 406 can be transitioned to, and held in, the retracted state in a similar manner.

The present disclosure is in no way limited to any of the holding and release devices and mechanisms implicated by the explanations above. In some embodiments, the closure or holding techniques utilize magnet(s) carried by the base that apply an attractive magnetic force to a complementary magnetic or metal body within or on the free end of the wing bodies. Another closure mechanism contemplated by the present disclosure is a latching design that could be in the form of a spring loaded ball bearing fitted into a recess in the wing body, or any other physical latch design. To open or release one or more of the wing bodies, one non-limiting embodiment as one or more buttons with a lever mechanism that when pushed, creates a wedge between the wing body (or bodies) and the base with just enough force to separate the free end of the wing body from the base a sufficient distance to overcome the magnetic attraction, allowing the wing body to open by a spring-loaded axis point. Other embodiments include using a sideways sliding mechanism that separates two opposing magnetic bodies enough to allow the spring-loaded wing body to self-open. Other press-to-release mechanisms could alternatively be employed as well to release the latch and catch. In yet other embodiments, the wing body can be opened via a physically engaging track and gear mechanism that when pushed, will move a gear end of the wing body in a rotational fashion to open the wing body.

Another alternative embodiment promoting opening of the wing bodies is to have an area of a top or side of the wing body configured such that when a user rubs their finger in the opposite direction of closure, the surface friction will create a force that causes the wing body to open up enough to allow the spring force to continue opening the wing body.

In some embodiments, the wing bodies can be closed (i.e., transitioned to the retracted state) independently of one another. With these optional embodiments, one wing body can be in the deployed stated and another wing body in the retracted state. In other embodiments, the holding device is configured such that the wing bodies are simultaneously closed in tandem.

The wing body or bodies can remain in a predetermined or set deployed (or open) state, based on having a back wedge that when fully opened, presses again the base or a portion of the base that limits the travel or rotation of the wing body. These wing bodies can also temporarily lock into position, for example by having a raised surface at the end of the wing body that when rotated, pressure fits into a recess that keeps the wing body in the deployed or open state.

Figure 12:
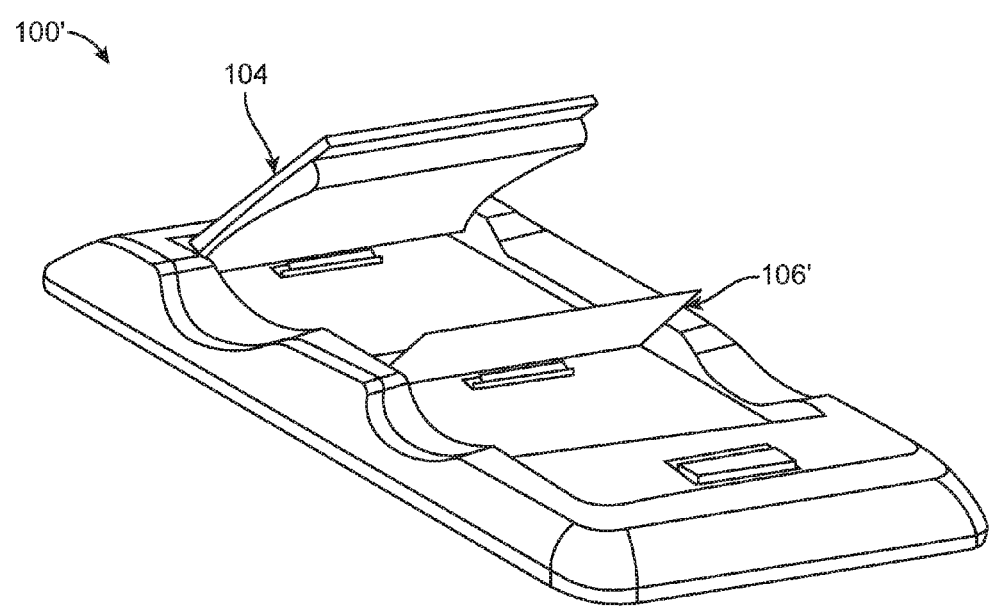
FIG. 12 is a perspective view of another handling apparatus of the present disclosure.

The wing bodies can be similar or different in terms of at least one of size, shape and spacing to allowing fitting for different hand sizes. FIG. 12 shows a handling apparatus 100' having wing bodies 104, 106' of different size and shape.

Although the present disclosure has been described with reference to preferred embodiments, workers skilled in the art will recognize that changes can be made in form and detail without departing from the spirit and scope of the present disclosure. For example, any of the handling apparatuses described above can alternatively include three (or more) of the corresponding wing bodies.

What is claimed is:

1. An apparatus for promoting user handling of a mobile phone, the apparatus comprising:
   a base defining a length and a width;
   first and second wing bodies each defining:
      a fixed end pivotably connected to the base,
      a free end opposite the fixed end, the free end being spaced from the base in a deployed state of the corresponding wing body,
      wherein in a retracted state of each of the wing bodies, a spacing between the corresponding free end and the base is less than the spacing in the corresponding deployed state;
   wherein the first and second wing bodies are arranged to extend from the corresponding fixed end to the corresponding free end in an identical direction relative to the length of the base;
   a first biasing device configured to bias the first wing body toward the deployed state;
   a second biasing device configured to bias the second wing body toward the deployed state;
   a first holding device for selectively retaining the first wing body in the retracted state;
   a second holding device for selectively retaining the second wing body in the retracted state; and
   a release mechanism for selectively disengaging at least the first wing body from the first holding device.

2. The apparatus of claim 1, wherein the base is configured for mounting to a mobile phone.

3. The apparatus of claim 1, wherein the base defines a first groove immediately adjacent the fixed end of the first wing body, and a second groove immediately adjacent the fixed end of the second wing body.

4. The apparatus of claim 1, wherein the first and second wing bodies are identical.

5. The apparatus of claim 1, wherein the first wing body differs from the second wing body by at least one characteristic selected from the group consisting of size and shape.

6. The apparatus of claim 1, wherein the first and second wing bodies are selectively transitionable between the deployed and retracted states.

7. The apparatus of claim 1, wherein the first biasing device and the second biasing device each includes a spring.

8. The apparatus of claim 1, wherein the first and second biasing devices are carried by the base.

9. The apparatus of claim 1, wherein the first and second holding devices each include a finger formed by the base.

10. The apparatus of claim 1, wherein the first and second holding devices each include a magnet.

11. The apparatus of claim 1, wherein the first and second holding devices are each configured to selectively interface with the free end of the corresponding wing body.

12. The apparatus of claim 1, wherein the release mechanism is configured to selectively disengage the second wing body from the second holding device simultaneously with disengagement of the first wing body from the first holding device.

13. The apparatus of claim 1, wherein the apparatus is configured such that when mounted to a mobile phone and the wing bodies in the deployed state, first and second fingers of the user's hand interface with and engage the first and second wing bodies, respectively, via gravity.

14. An apparatus for promoting user handling of a mobile phone, the apparatus comprising:
   a base defining a length and a width;
   first and second wing bodies each defining:
      a fixed end pivotably connected to the base,
      a free end opposite the fixed end, the free end being spaced from the base in a deployed state of the corresponding wing body,
      wherein in a retracted state of each of the wing bodies, a spacing between the corresponding free end and the base is less than the spacing in the corresponding deployed state;
   wherein the first and second wing bodies are arranged to extend from the corresponding fixed end to the corresponding free end in an identical direction relative to the length of the base;
   a first biasing device configured to bias the first wing body toward the deployed state;
   a second biasing device configured to bias the second wing body toward the deployed state;
   a first holding device for selectively retaining the first wing body in the retracted state;
   a second holding device for selectively retaining the second wing body in the retracted state;
   wherein the first and second holding devices each include a magnet.

15. An apparatus for promoting user handling of a mobile phone, the apparatus comprising:
   a base defining a length and a width;
   first and second wing bodies each defining:
      a fixed end pivotably connected to the base,
      a free end opposite the fixed end, the free end being spaced from the base in a deployed state of the corresponding wing body,
      wherein in a retracted state of each of the wing bodies, a spacing between the corresponding free end and the base is less than the spacing in the corresponding deployed state;
   wherein the first and second wing bodies are arranged to extend from the corresponding fixed end to the corresponding free end in an identical direction relative to the length of the base;
   a first biasing device configured to bias the first wing body toward the deployed state;
   a second biasing device configured to bias the second wing body toward the deployed state;
   a first holding device for selectively retaining the first wing body in the retracted state;
   a second holding device for selectively retaining the second wing body in the retracted state;
   wherein the first and second holding devices are each configured to selectively interface with the free end of the corresponding wing body.

* * * * *